United States Patent
Suman et al.

(10) Patent No.: US 9,842,239 B2
(45) Date of Patent: Dec. 12, 2017

(54) PRESENTATION SCANNER WITH USER INTERFACE TO PROVIDE FEEDBACK ABOUT OBJECT AND CODE INDICIA POSITION RELATIVE TO A SCANNING VOLUME

(71) Applicant: Datalogic IP Tech S.r.l., Bologna (IT)

(72) Inventors: Michele Suman, Padua (IT); Davide Bruni, Bologna (IT); Charles Forrister Atwater, Eugene, OR (US); Scott Gerald Horn, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 15/069,784

(22) Filed: Mar. 14, 2016

(65) Prior Publication Data
US 2017/0262675 A1   Sep. 14, 2017

(51) Int. Cl.
*G06K 7/14* (2006.01)
*G06K 7/10* (2006.01)
*G06K 15/00* (2006.01)

(52) U.S. Cl.
CPC ..... *G06K 7/10732* (2013.01); *G06K 7/10881* (2013.01); *G06K 7/1404* (2013.01); *G06K 15/002* (2013.01)

(58) Field of Classification Search
CPC ........ G06K 7/14; G06K 7/1404; G06K 7/146; G06K 15/002; G06K 15/005
See application file for complete search history.

(56) References Cited

U.S. PATENT DOCUMENTS

| | | | |
|---|---|---|---|
| 6,206,288 B1* | 3/2001 | May | G06K 7/10792 235/462.11 |
| 7,416,127 B2* | 8/2008 | Page | G06K 7/10851 235/462.2 |
| 7,562,817 B2 | 7/2009 | McQueen et al. | |
| 2005/0092834 A1* | 5/2005 | Latimer | G06K 7/10861 235/383 |
| 2008/0212039 A1* | 9/2008 | Taylor | G03B 21/14 353/79 |
| 2011/0132985 A1* | 6/2011 | McQueen | G01G 19/4144 235/454 |
| 2012/0318869 A1* | 12/2012 | Edmonds | G06K 7/10554 235/462.14 |

FOREIGN PATENT DOCUMENTS

WO    2015/104724 A1    7/2015

* cited by examiner

*Primary Examiner* — Christle I Marshall
(74) *Attorney, Agent, or Firm* — Dentons US LLP (57) ABSTRACT

A method of scanning an object may include determining that an object is proximately positioned relative to a scanning volume of a presentation scanner in response to receiving at least one object presence signal prior to scanning a code indicia positioned on the object. At least one object sensory indicator device may be activated in response to determining that the object is proximately positioned relative to the scanning volume so as to indicate that the object is proximate to the scanning volume to a user. A second level of detection and location feedback may be provided for code indicia within the scanning volume.

24 Claims, 12 Drawing Sheets

PRESENTATION SCANNER WITH USER INTERFACE TO PROVIDE FEEDBACK ABOUT OBJECT AND CODE INDICIA POSITION RELATIVE TO A SCANNING VOLUME

BACKGROUND

The use of barcode and other indicia scanners have become prevalent in retail, shipping, and logistics. There are a number of different types of scanners, and each provides benefits and shortcomings. Handheld or "gun" scanners are generally held by a user and used by facing the scanner along a line-of-sight toward a code indicia (e.g., barcode) on an object. Handheld scanners enable the user to estimate a scanning volume of the handheld scanner, and may also use a light, such as a laser, to help guide a user in targeting the code indicia. Presentation scanners are readers that are used to read patterns formed by code indicia representative of a code on objects. Presentation scanners have the advantage of being able to be used by a user without having to be operated by a user's hand, thereby enabling the user to use two hands when handling objects being scanned. Presentation scanners, however, may be more of a challenge than handheld or other scanners due to having to position the object in front of the presentation scanner that is often facing the user or in a direction that is not in a line-of-sight of the user. More particularly, locating a code indicia on the object being scanned within a scanning volume of the presentation scanner is also challenging for users of presentation scanners.

SUMMARY

To simplify use of a presentation scanner, a presentation scanner may include user interface that helps direct a user to position an object and/or code indicia in a scanning volume in front of an exit window of the presentation scanner. The user interface may include one or more visual devices, audio devices, vibration devices, or combination thereof that may be activated to indicate relative position of the object and/or code indicia in the scanning volume.

One embodiment of a presentation scanner may include a scanning device configured to scan code indicia on objects in a scanning volume via an exit window. A plurality of sensors oriented to sense an object in the direction that the scanning device is oriented. At least one sensory indicator device may be configured to produce a sensory output. A processing unit may be in communication with the scanning device, the sensors, and the sensory indicator device(s). The processing unit being may be configured to determine that the object is proximate to the scanning volume by receiving at least one object presence signal from at least one of the sensors. The sensory indicator device(s) may be activated in response to determining that the object is proximate to the scanning volume so as to indicate that the object is proximate to the scanning volume to a user.

One embodiment of a method of scanning an object may include determining that an object is proximately positioned relative to a scanning volume of a presentation scanner in response to receiving at least one object presence signal prior to scanning a code indicia positioned on the object. At least one object sensory indicator device may be activated in response to determining that the object is proximately positioned relative to the scanning volume so as to indicate that the object is proximate to the scanning volume to a user.

One embodiment of a method for informing a user in positioning a code indicia when using a presentation scanner may include capturing an image of an object, the image including at least a portion of a code indicia in a scanning volume. The image may be processed to identify the portion(s) of the code indicia. Location of the portion(s) of the code indicia may be located within the image. A sensory indicator may be generated to provide feedback of location of the portion(s) of the code indicia within the scanning volume.

One embodiment of a presentation scanner may include a scanning device configured to image an object on which a code indicia is positioned, a sensory indicator device, and a processing unit in communication with the scanning device and the sensory indicator. The processing unit may be configured to capture an image of the object, where the image may include at least a portion of a code indicia in a scanning volume of the scanning device. The image may be processed to identify the portion(s) of the code indicia. Location of the portion(s) of the code indicia may be determined within the image. The sensory indicator device may be caused to generate at least one sensory indicator to provide feedback of location of the portion(s) of the code indicia within the scanning volume.

BRIEF DESCRIPTION

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
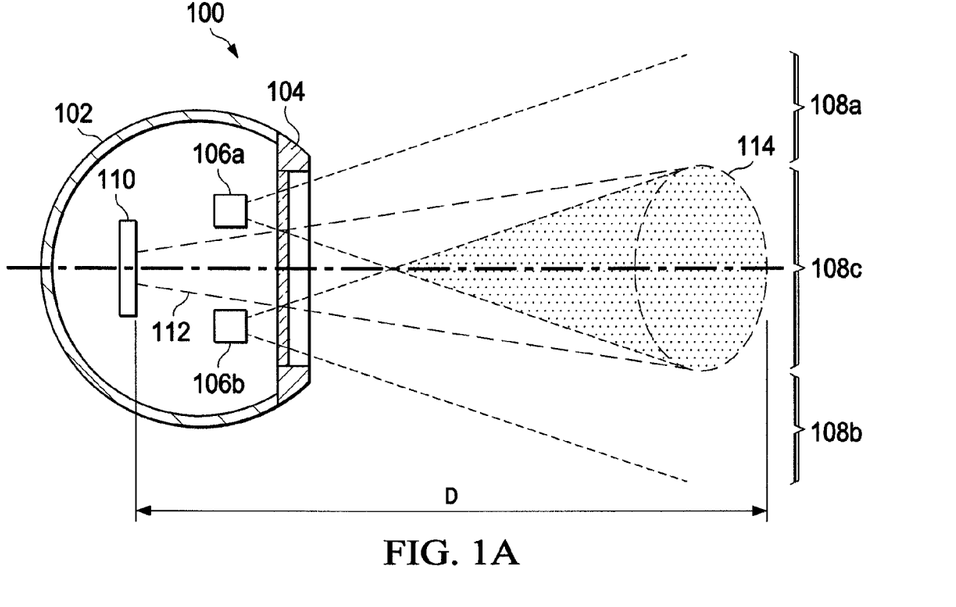
FIGS. 1A and 1B are illustrations of an illustrative presentation scanner configured to scan and read code indicia on objects.
Figure 1B:
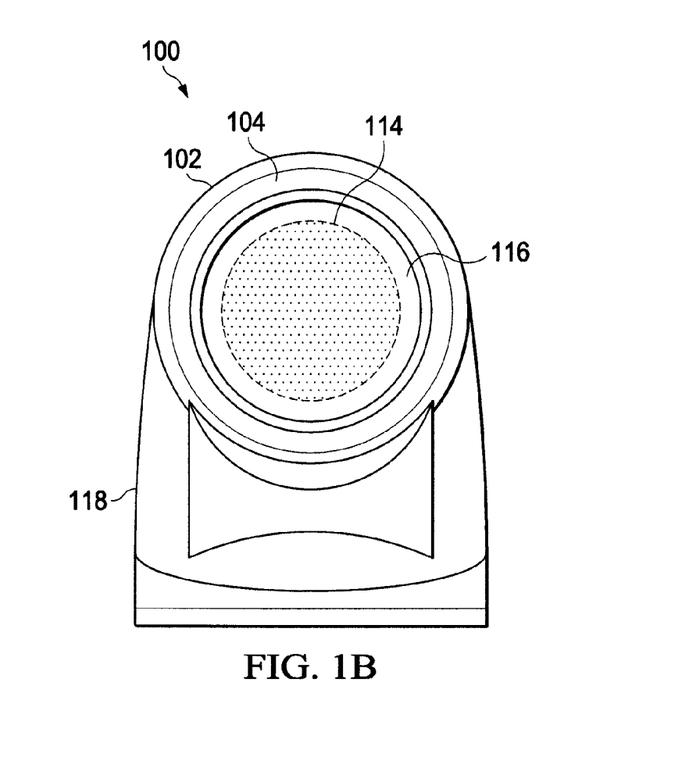

With regard to FIGS. 1A and 1B, illustrations of an illustrative presentation scanner 100 configured to scan and read code indicia on objects are shown. FIG. 1A is a top view of the presentation scanner 100 and shows a housing 102 and luminous ring 104 at a perimeter of an exit window 116 of FIG. 1B. The presentation scanner 100 is shown to include two sensors 106a and 106b that in operation form scan regions 108a, 108b, and 108c (collectively 108). The sensors 108 may be proximity sensors, such as time-of-flight sensors, as understood in the art. One such ToF sensor is a VL53L0 sensor produced by STMicroelectronics. In one embodiment, the sensors may be cameras that may capture images, and a processor may be used to determine that an object enters a field-of-view of at least one of the cameras. In yet another embodiment, the sensors may be motion sensors. It should be understood that the sensors 108 may be any other type of sensor that are capable of sensing an object, as understood in the art. Although only two sensors 106a and 106b are shown, it should be understood that three or more sensors may be used to provide for additional scan regions around the scanning volume 114, thereby identifying an object that is moving toward the scanning volume 114 from any angle.

A scanning device 110 may be configured to scan code indicia on or associated with objects. The code indicia may include patterns, such as those used by barcodes, QR codes, or any other machine-readable code, as understood in the art. The scanning device 110 may utilize any technology capable of reading code indicia, as understood in the art. For example, cameras or any other reading device may be utilized. As shown, the scanning device 110 has a field-of-view 112 that extends outward from the exit window 116 and a scanning volume 114 is formed with a center distance D. The scanning volume 114 may be spherical, oblong, or any other geometric or non-geometric shape based on a focal distance, scanning device type and configuration, optics, or any other feature. In one embodiment, the sensors 106 may use infrared or other non-visible wavelength such that no light guidance is provided for a user from the sensors 106. Guide lights (not shown) may be added to the presentation scanner 100 in one embodiment. As shown in FIG. 1B, the scanning volume 114 is centered in front of the exit window 116. It should be understood that alternative alignments of the scanning volume 114 may be utilized, but that the alignment in front of or in relation to the exit window 116 (and proximate the scanning volume 114) may be utilized. A pedestal 118 may provide a stand for the presentation scanner 100. Other configurations for supporting or mounting the presentation scanner for users to use as a hands-free, moveable scanning device may be utilized.

Figure 2A:
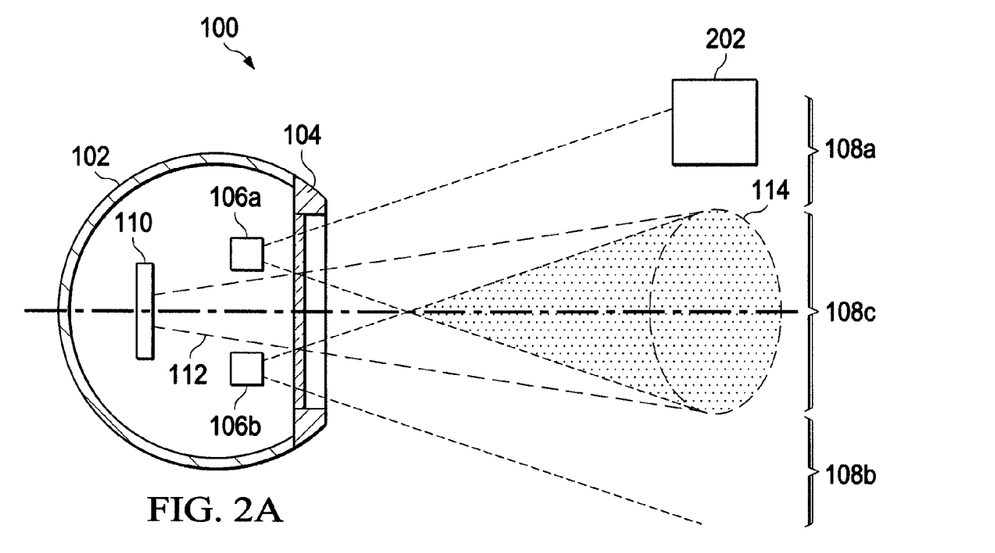
FIGS. 2A and 2B are illustrations of the presentation scanner of FIGS. 1A and 1B showing an object being sensed upon entering a first one of two scan regions on either side of a scanning volume of the presentation scanner.
Figure 2B:
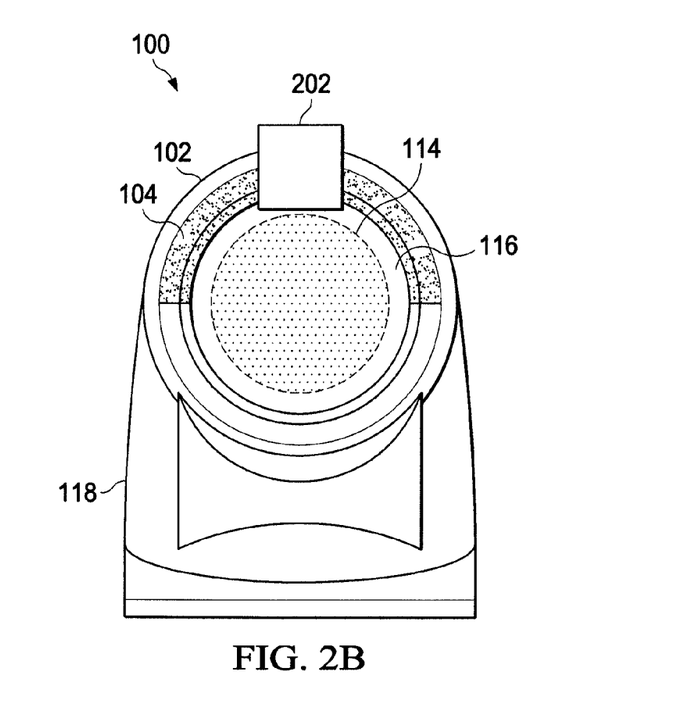

With regard to FIGS. 2A and 2B, illustrations of the presentation scanner of FIGS. 1A and 1B showing an object 202 being sensed upon entering a first one 108a of two sensing regions 108a and 108b on either side of a scanning volume 114 of the presentation scanner are shown. As the object 202 enters the sensing region 108a, sensor 106a senses that the object is entering the sensing region 108a. By identifying that the object 202 is entering the sensing region 108a, the presentation scanner 100 may turn on the scanning device 110, thereby saving power and extending life of the scanning device 110 while an object is not present to be scanned within the scanning volume 114.

Figure 3A:
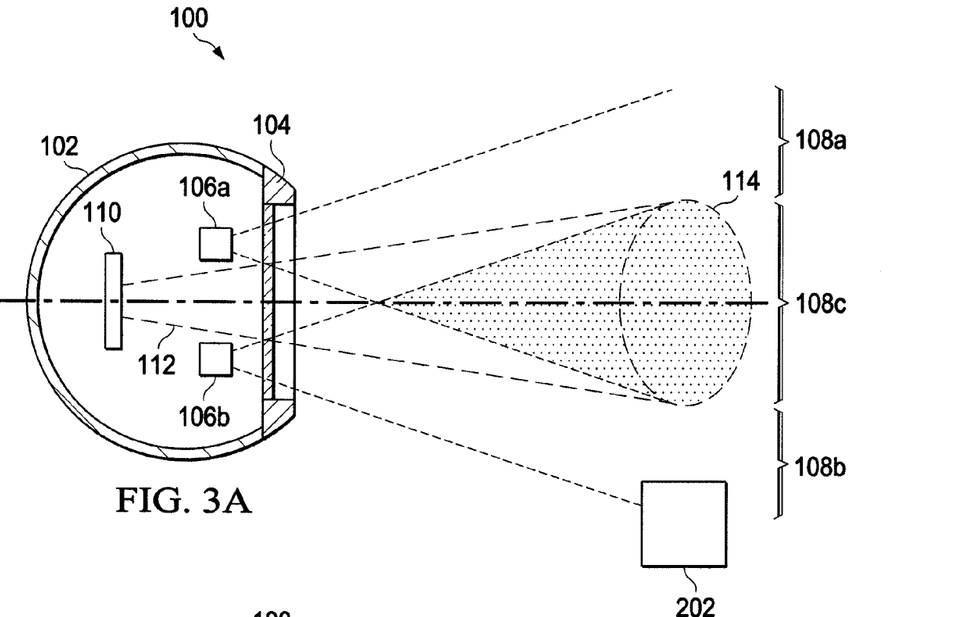
FIGS. 3A and 3B are illustrations of the presentation scanner of FIGS. 1A and 1B showing an object being sensed upon entering a second one of the two scan regions on either side of a scanning volume of the presentation scanner.
Figure 3B:
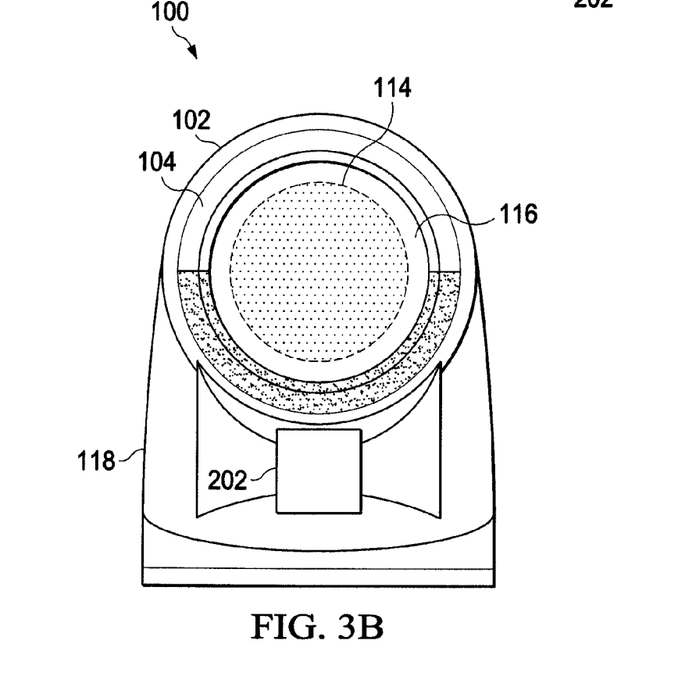

With regard to FIGS. 3A and 3B, illustrations of the presentation scanner of FIGS. 1A and 1B showing the object 202 being sensed upon entering a second sensing region 108b of the two sensing regions 108a and 108b on either side of the scanning volume 114 of the presentation scanner 100 are shown. As the object 202 enters the sensing region 108b, the sensor 106b senses that the object is entering the sensing region 108a. By identifying that the object 202 is entering the sensing region 108a, the presentation scanner 100 may turn on the scanning device 110.

Figure 4A:
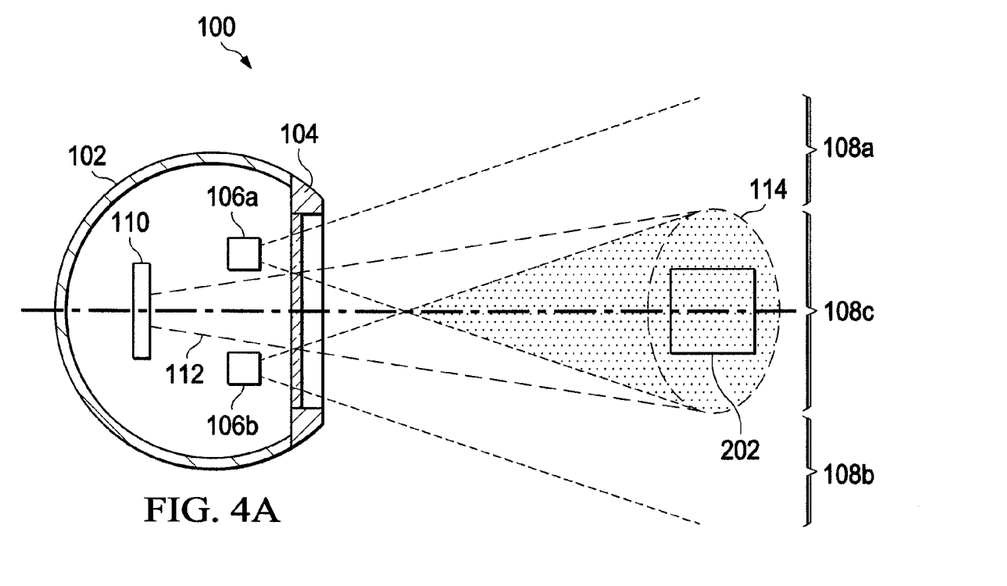
FIGS. 4A and 4B are illustrations of the presentation scanner of FIGS. 1A and 1B showing an object being sensed upon entering a third scan region within a scanning volume of the presentation scanner.
Figure 4B:
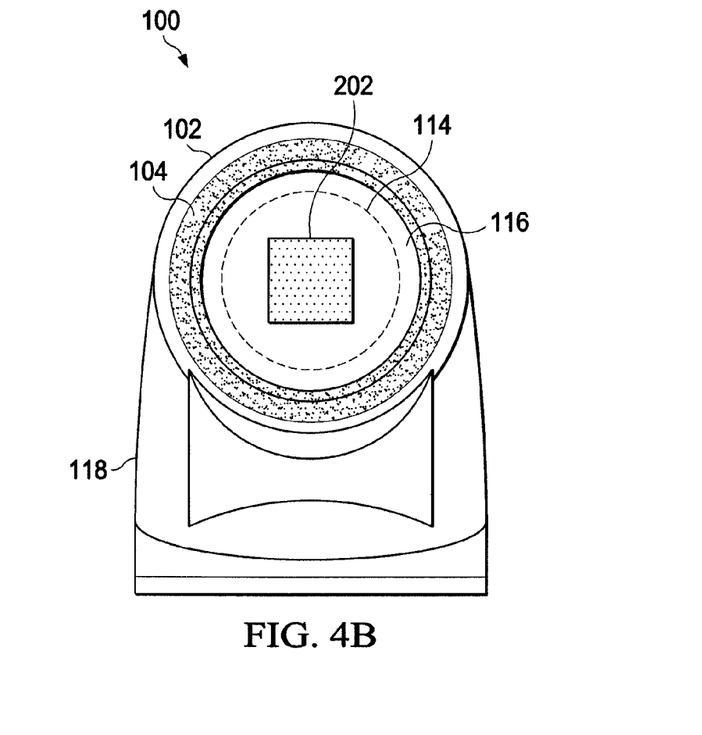

With regard to FIGS. 4A and 4B, illustrations of the presentation scanner of FIGS. 1A and 1B showing the object 202 being sensed upon entering a third sensing region 108c of the sensing regions 108a, 108b, and 108c formed by sensors 106a and 106b within the scanning volume 114 of the presentation scanner 100 are shown. The scanning device 110 may scan or image a code indicia, such as a barcode, that is positioned on the object 202 when in the scanning volume 114. If more than two sensors are utilized, the presentation scanner 100 may be configured to turn on the scanning device 110 when two or more of the sensors sense that the object is within the sensing region 108c.

With regard to FIGS. 5A-5D, illustrations of an illustrative presentation scanner 500 inclusive of an exit window 502 through which an imaging device (not shown) is directed and a sensory indicator device 504 is supported are shown. As shown, in each of the FIGS. 5A-5D, a code indicia 506, in this case a barcode, is brought from below a scanning volume 508 and into the scanning volume 508. The presentation scanner 500 is configured to sense the code indicia 506 and cause the sensory indicator device 504 to generate a color, such as yellow, when the code indicia 506 is not within the scanning volume 508, and a second color, such as green, when the code indicia 506 is in the scanning volume 508. The use of an audible sound may be used to indicate when the code indicia 506 is or is not in the scanning volume 508, as well. The sensory indicator device 504 may be formed of multiple light elements, such as LEDs, that may be individually or collectively activated to turn on and/or change colors as the code indicia 506 enters into the scanning volume.

Figure 5A:
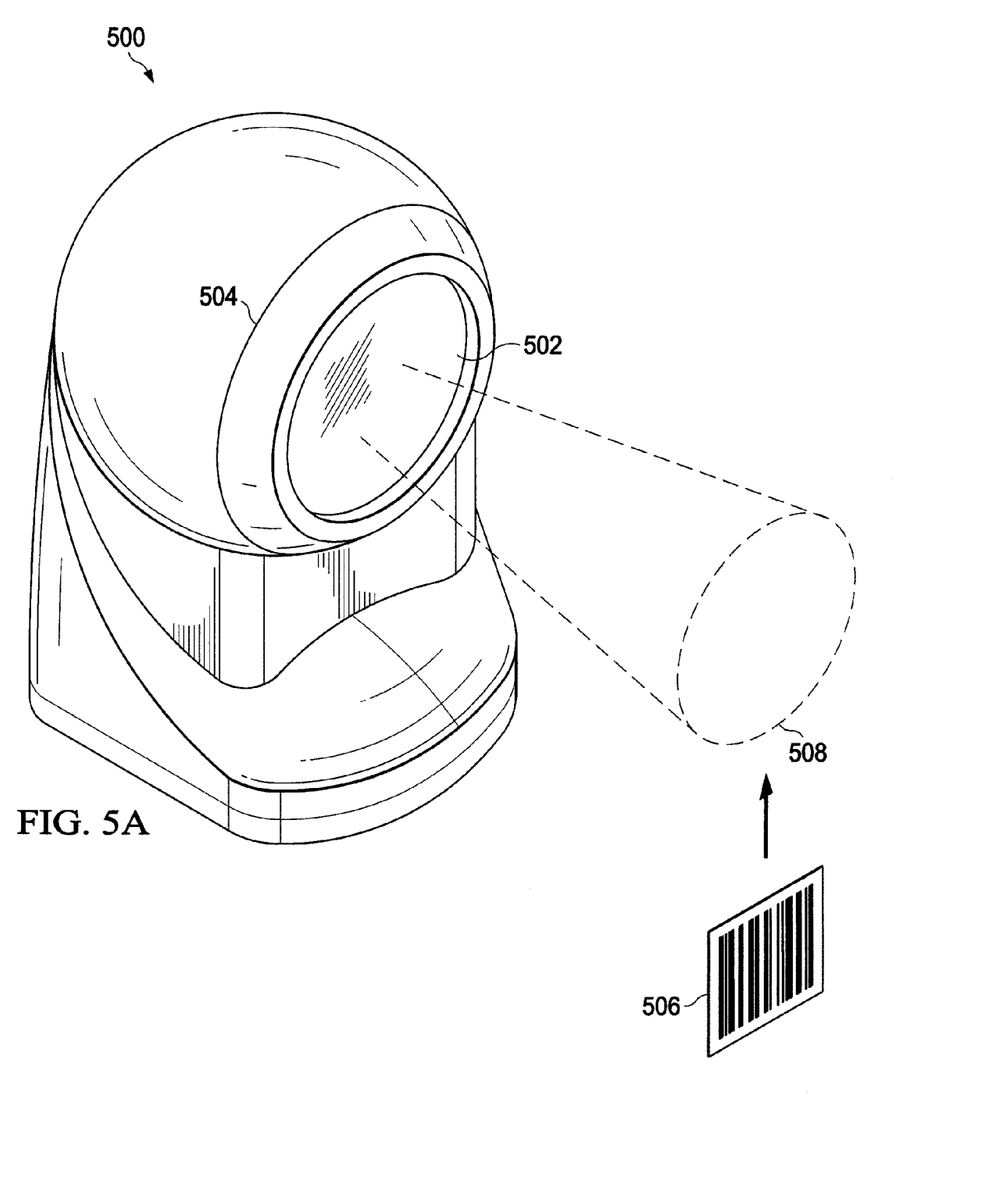
FIGS. 5A-5D are illustrations of an illustrative presentation scanner in which a code indicia, in this case a barcode, is brought from below a scanning volume and into the scanning volume.
Figure 5B:
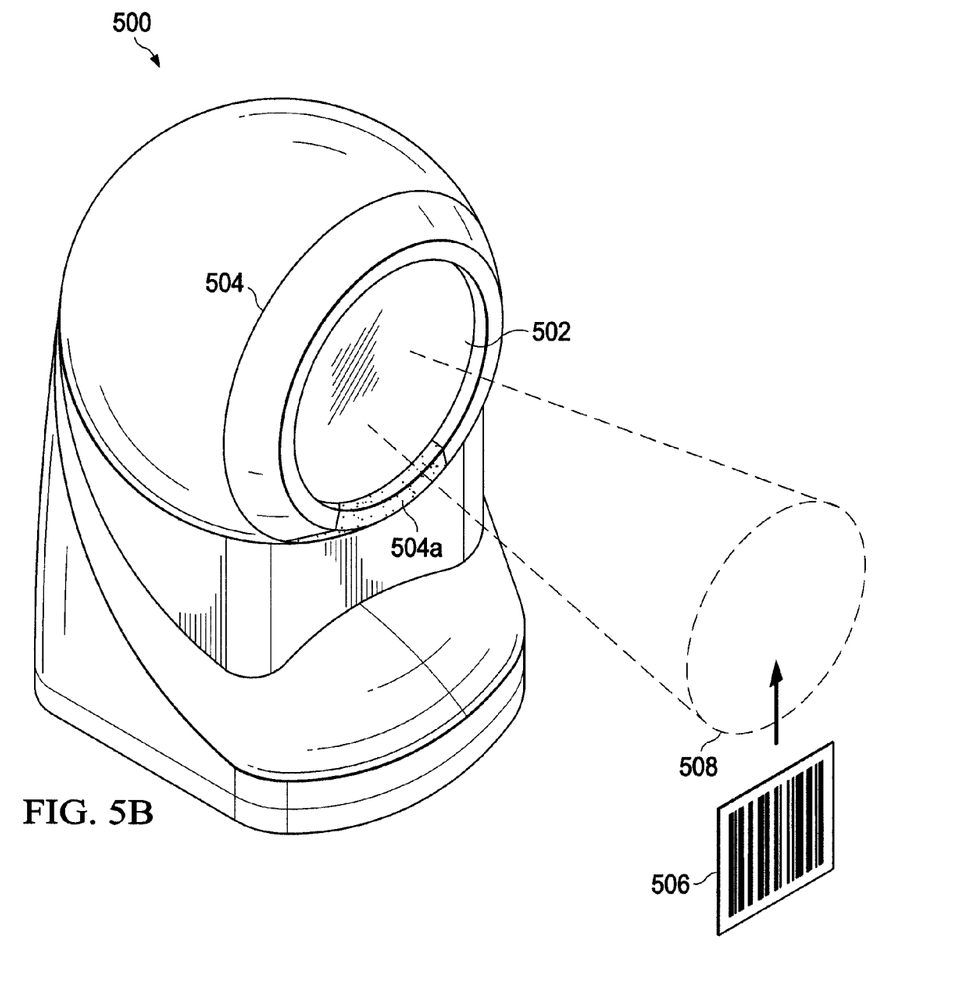
Figure 5C:
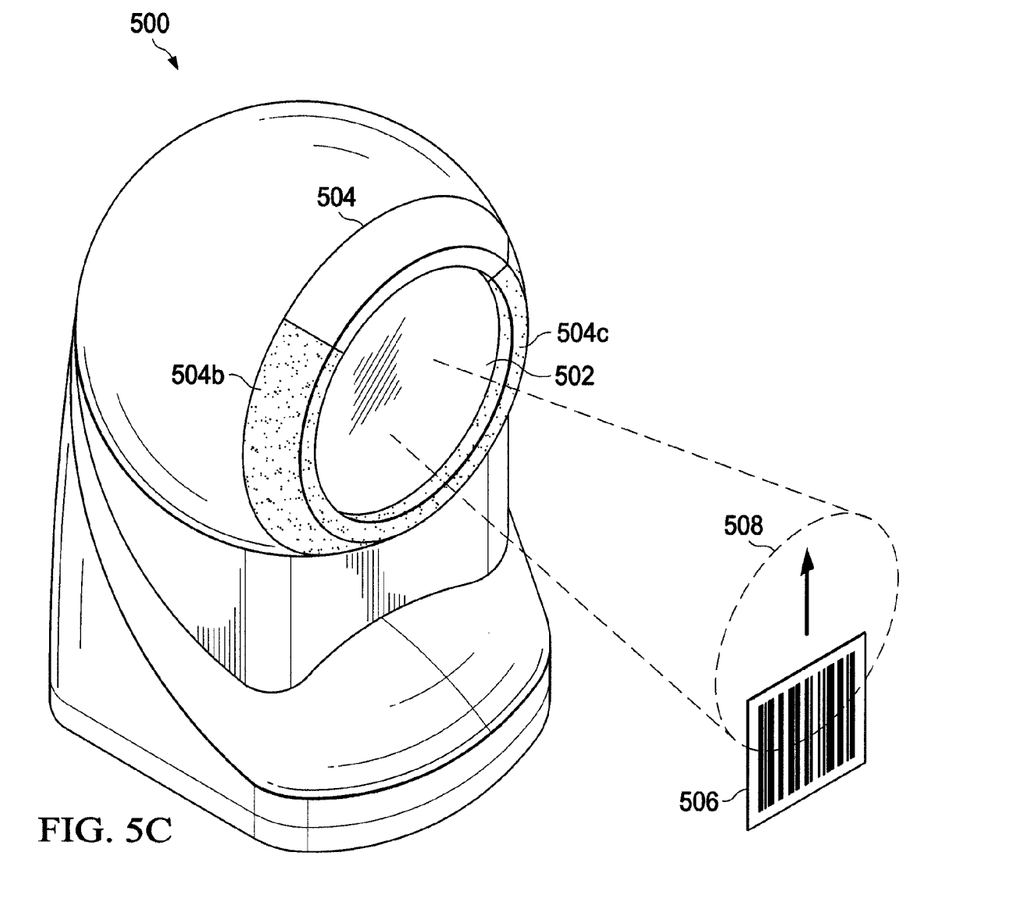
Figure 5D:
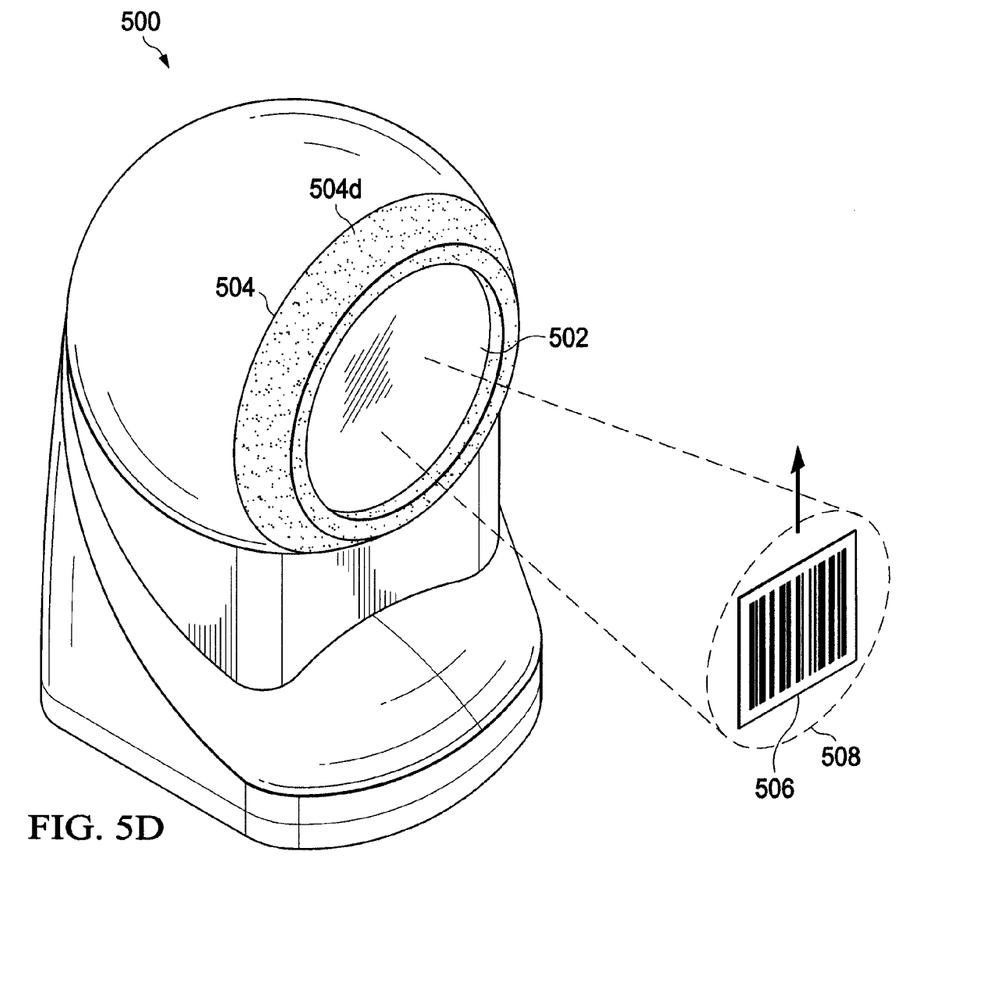

As shown in FIG. 5A, the sensory indicator device 504 is uniform in color, such as yellow, as the code indicia 506 is not within the scanning volume 508. As the code indicia 506 enters the scanning volume 508 in FIG. 5B, a lower portion 504a of the sensory indicator device 504 may change color (e.g., from yellow to green), while the remainder of the sensory indicator device 504 remain(s) the same color. In FIG. 5C, as the code indicia 506 further enters the scanning volume 508, additional portions 504b and 504c of the sensory indicator device 504 are changed in color. As the entire code indicia 506 is within the scanning volume 508, the last portion 504d is changed in color so that a user knows that the code indicia 506 is properly located to be scanned and read by the presentation scanner 500. Such identification of the code indicia 506 may utilize an accelerator engine (e.g., circuitry, such as an ASIC, inclusive of a code indicia identification function) to increase speed of identification of location of the code indicia 506. Rather than or in addition to changing color, the sensory indicator device 504 may flash or otherwise be controlled to indicate that the code indicia 506 is correctly positioned for scanning.

It should be understood that the scanning of the code indicia 506 and providing feedback to a user via the sensory indicator device 504 is a different process than that of sensing an object on which a code indicia is located. As previously described with regard to FIGS. 2A-4B, the sensing of the object 202 may be used to assist a user with positioning the object and to turn on the scanning device 110, thereby saving energy. FIGS. 5A-5D solve the problem where the object may be proximate or in the scanning volume, but the code indicia may not be. By providing feedback for location of the code indicia independent of the object on which the code indicia is positioned, a user may be better able to scan code indicia on objects. In one embodiment, the presentation scanner may be configured so that the sensing of an object produces a different output, such as a color of light, by a sensory indicator device than the imaging of a code indicia. As an example, the sensing of the object may cause the sensory indicator device to display a color, such as red, prior to sensing an object, changing the color to another a color, such as blue, in one or more sections when the object enters and fills the scanning volume, as described with regard to FIGS. 2A-4B, and then the sensory indicator device changes to the colors yellow and green when reading a portion and complete code indicia, as described with regard to FIGS. 5A-5D. Other indicators and protocols may be utilized, as well.

In the event that the object and/or code indicia is beyond the scanning volume (e.g., greater than 30 cm and less than 60 cm), the presentation scanner may generate a distance signal to cause the sensory indicator device 504 to turn another color, such as red, or change an audible sound (e.g., change frequency of a tone). Such changes in light and/or sound may be dynamic as position of an object and code indicia is moved by a user. Calibration of sensing regions and scanning volume may be performed by aligning sensors and scanning device.

Although described with regard to lights and colors, the sensory indicator device 504 may alternatively be or additionally include one or more speakers that are able to output an audible sound, such as a Geiger counter sound, ascending tone, clicks, etc. The use of audible sounds provides user feedback and enables a user to operate the presentation scanner without having to continuously view the presentation scanner.

Figure 6:
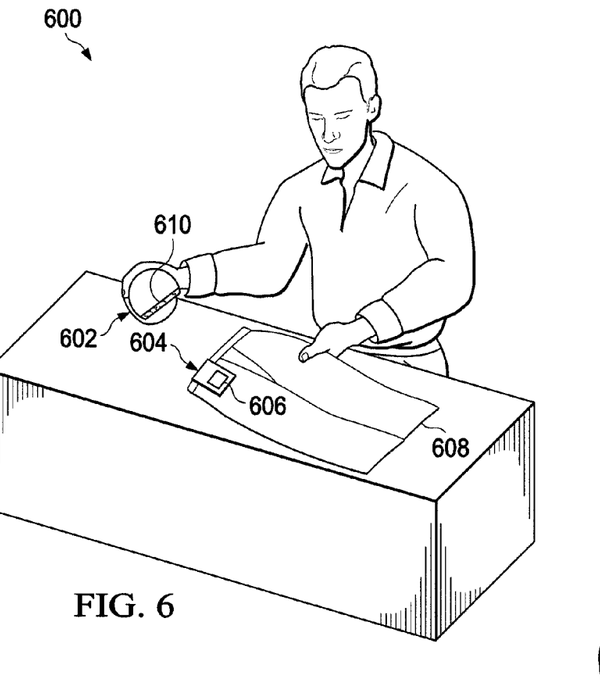
FIG. 6 is an illustration in which a user is using a presentation scanner in a handheld manner to scan a tag with a code indicia on an object, in this case an article of clothing.

With regard to FIG. 6, an illustration of a scene 600 in which a user is using a presentation scanner 602 in a handheld manner to scan a tag 604 with a code indicia 606 on an object 608, in this case an article of clothing, and more particularly a pair of jeans, is shown. The presentation scanner 602 includes a sensory indicator device 610 that forms a ring around an outside perimeter of an opening that defines an exit window region of the presentation scanner 602. It should be understood that the indicator device 610 may have a different configuration (e.g., arrows), and be positioned on or near the presentation scanner 602. The sensory indicator device 610 may be formed by multiple lights, and be segmented so that different parts of the device 610 may be illuminated to indicate to the user that the object 608 is at least partially sensed and/or code indicia 606 is at least partially identified, as previously described. Because the code indicia 606 is within a scanning volume (not shown), the sensory indicator device 610 may be displayed using a "successful location" color, such as green.

Figure 7A:
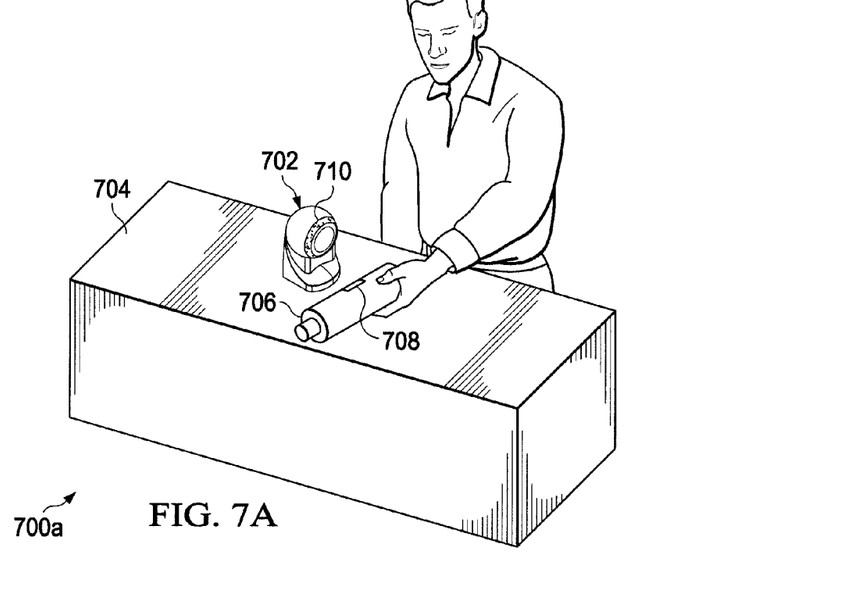
FIG. 7A is another illustration in which a user is using a presentation scanner in a resting position to scan a barcode on a product, in this case, a shampoo bottle.

With regard to FIG. 7A, another illustration of a scene 700a in which a user is using a presentation scanner 702 in a resting position on a tabletop 704 to scan a product 706, in this case a shampoo bottle inclusive of a barcode 708, is shown. Because the barcode 708 is successfully positioned within a scanning volume (not identified), a sensory indicator device 710 may be displayed using the "successful location" color.

Figure 7B:
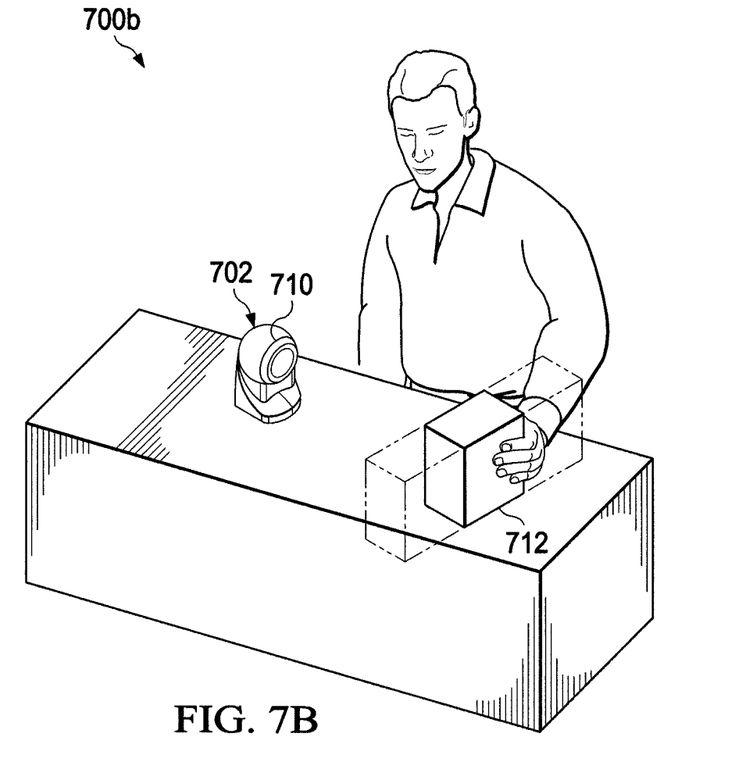
FIG. 7B is an illustration in which a user is using the presentation scanner of FIG. 7A, and the scanner determines that the object is too far away or moving too fast to scan a barcode thereon.

With regard to FIG. 7B, an illustration in which a user is using the presentation scanner 702 of FIG. 7A, and the scanner 702 determines that an object 712, in this case a box of cookies, is too far away or moving too fast to properly scan a barcode thereon is shown. As a result of the object 712 being too far or moving too fast, as determined by a processing unit measuring rate of motion of lines or line spacing being blurred, the sensory indicator device 710 may generate a distance signal indicative of distance or motion signal indicative of too much motion to cause the sensory indicator device 710 to display a different color, such as blue or red. It should be understood that alternative scenarios in which the object or barcode is out of the scanning volume and at least a part of the sensory indicator device 710 is displayed in a color indicative that the object is not being sensed by two or more sensors (e.g., proximity sensors) and/or that a code indicia is not fully within the scanning volume.

Figure 8:
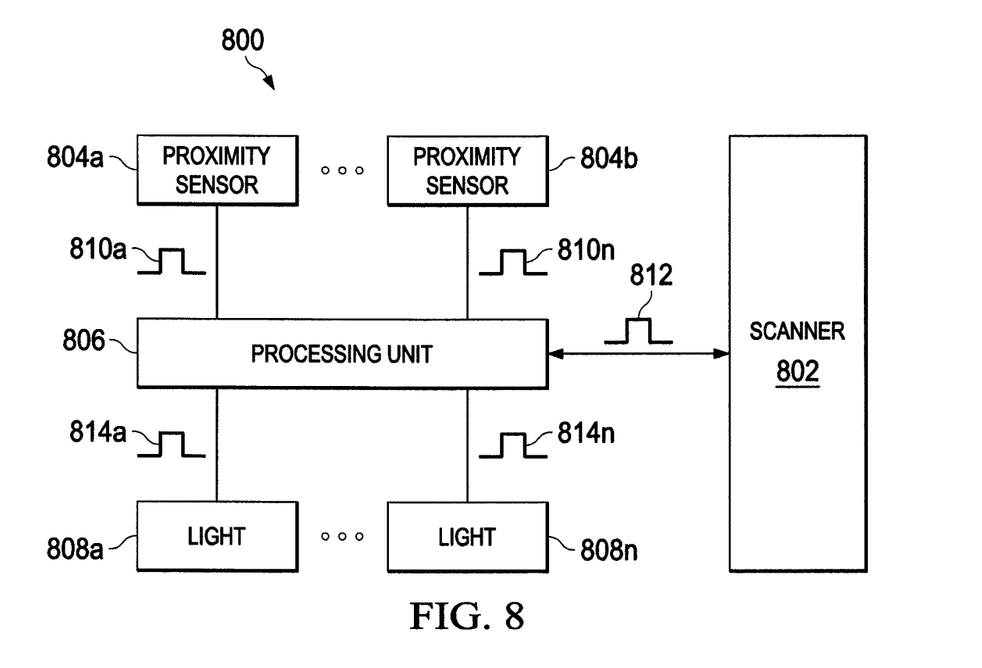
FIG. 8 is a block diagram of an illustrative presentation scanner inclusive of proximity sensors and lights for supporting scanning functionality described herein.

With regard to FIG. 8, a block diagram of an illustrative presentation scanner 800 inclusive of a scanner 802, proximity sensors 804a-804n (collectively 804), processing unit 806 and lights 808a-808n (collectively 808) for supporting scanning functionality described herein is shown. The scanner 802 may be a camera configured to image a code indicia within a scanning volume, as previously described. The processing unit 806 may include one or more processors, including microprocessor, image processor, signal processor, FPGA, ASIC, or other component and circuitry, as understood in the art.

In operation, the proximity sensor(s) 804 may sense an object outside of (proximate to) and within a scanning volume generated by the scanner 802. In response to sensing the object by one or more of the proximity sensors 804, one or more object sense or presence signals 810a-810n (collectively 810) may be generated and communicated to the processing unit 806. In response to receiving an object sense signal 810a, for example, that indicates that an object is proximate the scanning volume, the processing unit 806 may generate a "turn on scanner" or activate scanner signal 812 that causes the scanner 802 to be turned on. In addition, responsive to the processing unit 806 determining which of the proximity sensor(s) sensed an object, the processing unit 806 may communicate respective signal(s) 814a-814n (collectively 814) to cause one or more of the lights 808 to turn on. In one embodiment, the signals 814 may include data that causes the lights 808 to turn on a certain color (e.g., red, yellow, green, blue). The processing unit 806 may further receive image signals from the scanner 802 and perform image processing (e.g., pattern matching for matching line spacing, bar spacing, shape spacing or shape identification, or other indicia with a predetermined or standardized spacing) on at least a portion of code indicia that has been imaged. A distance signal (not shown) may also be generated by the processing unit 806 based on the proximity sensor(s) 804 sensing that the object and/or code indicia is positioned beyond the scanning volume or too close to the scanner 802 to notify the user that the object and/or code indicia is to be moved closer to or farther from the scanner 802. Similarly, a motion signal may be generated by the processing unit 806 determining that the object or code indicia is moving too fast. The processing unit 806 may, based on the image processing, determine location of the code indicia and turn on corresponding light(s) in a color that indicates whether a portion or an entire code indicia is being imaged within a portion or entire scanning volume.

Figure 9:
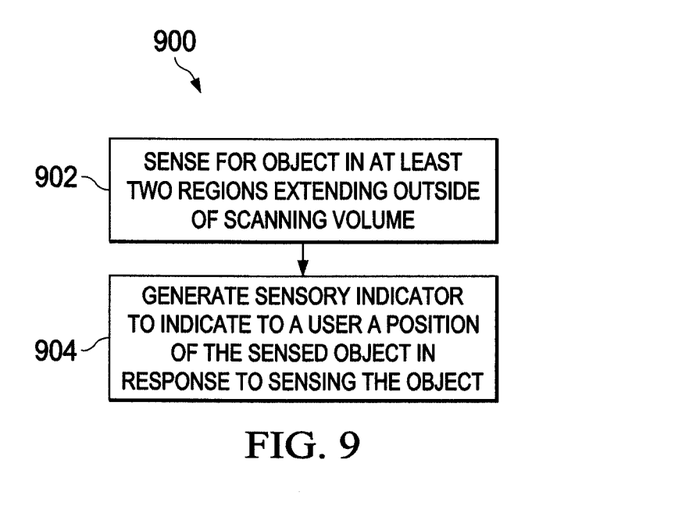
FIG. 9 is a flow diagram of an illustrative process for performing object sensing functionality of a presentation scanner as described herein.

With regard to FIG. 9, a flow diagram of an illustrative process 900 for performing object sensing functionality of a presentation scanner as described herein is shown. The process 900 may start at step 902, where an object may be sensed in at least two regions extending outside of a scanning volume. By sensing for an object outside of a scanning volume, the presentation scanner may maintain a scanner device in an OFF state until an object is sensed to be close to or proximate to the scanning volume of the scanning device, upon which the scanner device may be transitioned to an ON state. Responsive to the object being removed from the sensing regions, the scanner device may be transitioned back to the OFF state. In being close to or proximate to the scanning volume, the object may be within one inch, one-half inch, or other distance from the scanning volume, and the sensing regions may be calibrated to determine that proximity between the outside edge of the scanning volume and the scanning volume. At step 904, a sensory indicator may be generated to indicate to a user of a position of the sensed object in response to sensing the object. The sensory indicator may be an illuminated light, audible sound, or both to notify the user of the presentation scanner that the object is being sensed by at least one sensor. In addition, in response to a sensor sensing an object, a scanning device (e.g., 2D camera) may be turned on to begin imaging for a code indicia, such as a barcode, to read.

Figure 10:
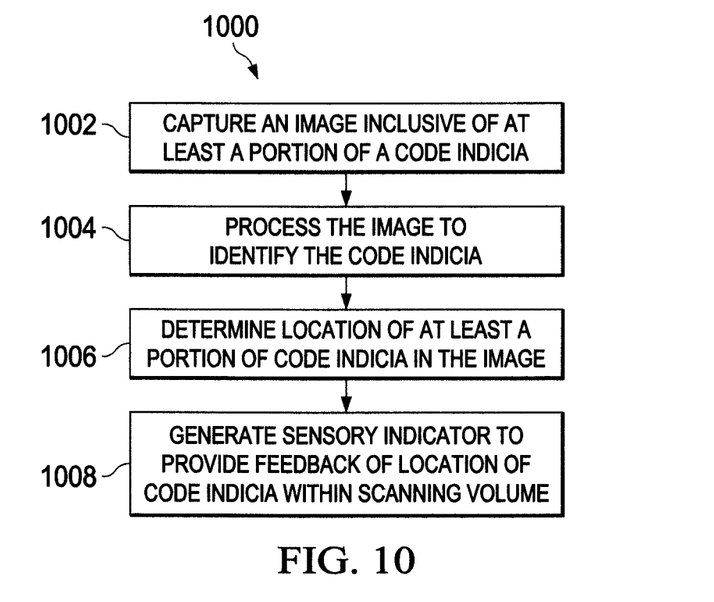
FIG. 10 is a flow diagram of another illustrative process for performing code reading functionality using a presentation scanner as described herein.

With regard to FIG. 10, a flow diagram of another illustrative process 1000 for performing code reading functionality described herein is shown. The process 1000 may start at step 1002, where an image inclusive of at least a portion of a code indicia may be captured. In capturing a portion, a left portion, right portion, corner, bottom, top, diagonal, or otherwise may be imaged. At step 1004, the image may be processed to identify the code indicia. The processing of the image may include image processing, and a pattern matcher or other image processing algorithm may be used to determine that at least a portion of the code indicia is within the image. At step 1006, location of at least a portion of code indicia in the image may be determined. In determining the location, the image processing may determine whether the code indicia or portion thereof is at a particular edge or corner as the code indicia begins to enter the scanning volume. In one embodiment, the image processing may be configured to determine direction that the code indicia is being read, such as from the front, back, top, or bottom, by determining location of a start and/or end indicator of the code indicia, and use that information for code stitching or other purposes. At step 1008, a sensory indicator may be generated to provide feedback of location of code indicia within the scanning volume. The sensory indicator may include a visual indicator, audible indicator, or combination thereof. In one embodiment, as a location of the code indicia is determined, future image processing may be performed in a localized region (e.g., bottom left) of an image of a previously identified location of the code indicia, thereby increasing speed of processing an image and code indicia within the image.

By combining the processes 900 and 1000 of FIGS. 9 and 10, respectively, two levels of user feedback may be provided by the presentation scanner. That is, the two levels may include (i) determining that an object is detected within a sensing region, and (ii) detecting a pattern of a code indicia to position a barcode within a scanning volume. In one embodiment, the scanning volume may be divided into quadrants, which may further assist a user by feeding back which quadrant(s) that a code indicia is positioned.

Figure 11:
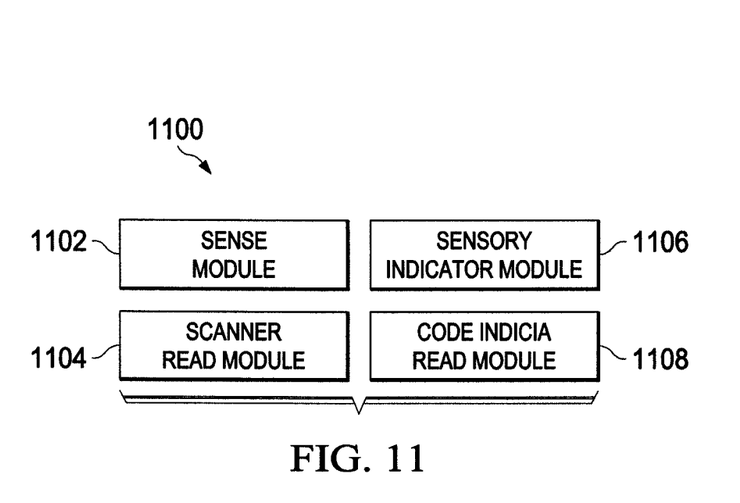
FIG. 11 is a block diagram of an illustrative set of software modules executed by a processing of a presentation scanner to perform the functionality described herein.

With regard to FIG. 11, a block diagram of an illustrative set of software modules 1100 executed by a processing unit to cause a presentation scanner to perform functionality, as described herein. The modules 1100 may include a sense module 1102 that is configured to receive sense signals to determine whether an object is being sensed by one or more sensors (e.g., proximity sensors). The sense module 1102 may also be configured to control a sensory indicator device that includes one or more lights, speaker(s), vibrator(s), or other sensory output devices to indicate to a user whether an object is near a scanning volume. In controlling lights, both illumination and color may be controlled to provide the user with granular feedback to position an object proximately relative to a scanning volume.

A scanner read module 1104 may be configured to read a code indicia. The module 1104 may be configured to be turned on in response to the sense module 1102 sensing that an object is proximate to a scanning volume.

A sensory indicator module 1106 may be configured to output a light, sound, vibration, or combination thereof to indicate to a user of the presentation scanner a relative position of an object and/or code indicia to a scanning volume. In one embodiment, the module may be configured to determine which portions or segments of a light (e.g., set of LEDs) to illuminate along with color to illuminate the light.

A code indicia read module 1108 may be configured to read a scanned or imaged code indicia. The module 1108 may utilize reading techniques, as understood in the art.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein, but is to be accorded the widest scope consistent with the following claims and the principles and novel features disclosed herein.

What is claimed is:

1. A presentation scanner, comprising:
    a scanning device configured to scan code indicia on objects in a scanning volume via an exit window;
    a plurality of sensors oriented to sense an object in the direction that said scanning device is oriented;
    at least one sensory indicator device configured to produce a sensory output; and
    a processing unit in communication with said scanning device, said sensors, and said at least one sensory indicator device, said processing unit being configured to:
        determine that the object is proximate to the scanning volume by receiving at least one object presence signal from at least one of said sensors; and
        activate said at least one sensory indicator device in response to determining that the object is proximate to the scanning volume so as to indicate to a user that the object is proximate to the scanning volume.

2. The presentation scanner according to claim 1, further comprising a housing on which said at least one sensory indicator device is supported, said at least one sensory indicator device including a plurality of illumination devices.

3. The presentation scanner according to claim 1, wherein said sensors are oriented to form at least three sensing regions, a first sensing region extending within and outside of the scanning volume and sensed by a first sensor, a second sensing region extending within and outside of the scanning volume and sensed by a second sensor, and a third sensing region within the scanning volume and sensed by both said first and second sensors.

4. The presentation scanner according to claim 3, wherein said sensors are configured to be housed in the presentation scanner, and wherein the at least three sensing regions are configured to extend outward from the exit window.

5. The presentation scanner according to claim 3, wherein said at least one sensory indicator device includes a plurality of illumination devices, and wherein at least two of the illumination devices correspond to at least two of the sensing regions, and, responsive to said processing unit determining that the object is positioned in any of the at least three sensing regions, said processing unit causing one or more of the illumination devices to illuminate based on which of the respective sensing regions that the object is sensed to be positioned to provide feedback to the user positioning the object relative to the scanning volume of said scanning device.

6. The presentation scanner according to claim 5, wherein said processing unit is further configured to cause (i) a first illumination device to display a first color in response to determining that the object enters the first sensing region, (ii) a second illumination device to display the first color in response to determining that the object enters the second sensing region, and (iii) the first and second illumination devices to display a second color in response to determining that the object enters the third sensing region.

7. The presentation scanner according to claim 1, wherein said sensors are time-of-flight proximity sensors.

8. The presentation scanner according to claim 7, wherein the time-of-flight proximity sensors are configured to generate a distance signal and to communicate the distance signal to said processing unit, and wherein said processing unit causes said at least one sensory indicator device to produce an output as a function of distance of the sensed object from the presentation scanner.

9. The presentation scanner according to claim 1, wherein said at least one sensory indicator includes an audio device, and, responsive to the object being sensed by said at least one sensor, said processing unit causing a first audible sound to indicate when the object is being sensed by one sensor and a second audible sound to indicate when the object is being sensed by at least two sensors in the scanning volume.

10. The presentation scanner according to claim 1, wherein said processing unit is configured to detect a pattern representative of at least a portion of a code indicia positioned on the object.

11. The presentation scanner according to claim 10, wherein said processing unit is further configured to detect location of the pattern within the scanning volume of said scanning device.

12. The presentation scanner according to claim 11, wherein said processing unit, in detecting location of the pattern within the scanning volume, causes said at least one sensor indicator device to produce sensory output that provides feedback to the user to indicate that the pattern is not fully within the scanning volume.

13. A method of scanning an object, comprising:
 determining an object is proximately positioned relative to a scanning volume of a presentation scanner in response to receiving at least one object presence signal prior to scanning a code indicia positioned on the object; and
 activating at least one object sensory indicator device in response to determining that the object is proximately positioned relative to the scanning volume so as to indicate to a user that the object is proximate to the scanning volume.

14. The method according to claim 13, further comprising sensing at least three sensing regions, including a first sensing region extending within and outside of the scanning volume, a second sensing region extending within and outside of the scanning volume, and a third sensing region within the scanning volume.

15. The method according to claim 14, wherein activating includes activating at least one illumination device, and wherein responsive to the object being positioned in any of the at least three sensing regions, illuminating one or more of the illumination devices based on which of the respective sensing regions that the object is positioned to provide feedback to the user positioning the object relative to the exit window.

16. The method according to claim 15, further comprising causing (i) a first illumination device to display a first color in response to determining that the object enters the first sensing region, (ii) a second illumination device to display the first color in response to determining that the object enters the second sensing region, and (iii) the first and second illumination devices to display a second color in response to determining that the object enters the third sensing region.

17. The method according to claim 14, wherein the at least three sensing regions are configured to extend outward from the exit window.

18. The method according to claim 13, further comprising supporting at least one sensory indicator device by the presentation scanner, the at least one sensory indicator device including a plurality of illumination devices.

19. The method according to claim 18, further comprising measuring time-of-flight from the presentation scanner to the object.

20. The method according to claim 19, further comprising:
 generating a distance signal; and
 causing a sensory output as a function of distance of the sensed object from the presentation scanner.

21. The method according to claim 13, wherein responsive to the object being sensed, causing the at least one sensory indicator device to produce a first audible sound to indicate when the object is being sensed by one sensor and a second audible sound to indicate when the object is being sensed within the scanning volume.

22. The method according to claim 13, further comprising detecting a pattern representative of at least a portion of the code indicia positioned on the object.

23. The method according to claim 22, further comprising detecting location of the pattern within the scanning volume.

24. The method according to claim 23, wherein responsive to detecting location of the pattern within the scanning volume, producing sensory output that provides feedback to the user that indicates that the pattern is not fully within the scanning volume.

* * * * *